United States Patent
Thrun et al.

(10) Patent No.: US 12,271,062 B1
(45) Date of Patent: Apr. 8, 2025

(54) SYSTEM FOR CALIBRATING ADJUSTABLE LENSES

(71) Applicant: Apple Inc., Cupertino, CA (US)

(72) Inventors: Maxwell T. Thrun, Fremont, CA (US); Yu Horie, Cupertino, CA (US); Joshua J. Siegel, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 247 days.

(21) Appl. No.: 17/396,483

(22) Filed: Aug. 6, 2021

Related U.S. Application Data

(60) Provisional application No. 63/064,804, filed on Aug. 12, 2020.

(51) Int. Cl.
| | |
|---|---|
| *G02C 7/08* | (2006.01) |
| *G02C 11/00* | (2006.01) |
| *G02F 1/1335* | (2006.01) |
| *G06T 7/50* | (2017.01) |
| *G06V 40/19* | (2022.01) |

(52) U.S. Cl.
CPC ............ *G02C 7/083* (2013.01); *G02C 11/10* (2013.01); *G02F 1/133526* (2013.01); *G06T 7/50* (2017.01); *G06V 40/19* (2022.01)

(58) Field of Classification Search
CPC .......... G02C 7/083; G02C 11/10; G02C 7/08; G02F 1/133526; G06T 7/50; G06V 40/19
See application file for complete search history.

(56) References Cited

U.S. PATENT DOCUMENTS

| | | | |
|---|---|---|---|
| 6,568,809 B2 | 5/2003 | Trajkovic et al. | |
| 8,929,589 B2 | 1/2015 | Publicover et al. | |
| 9,213,405 B2* | 12/2015 | Perez | G02B 27/017 |
| 10,133,090 B2 | 11/2018 | Jiang | |
| 10,620,457 B2 | 4/2020 | Ain-Kedem | |
| 11,385,481 B1* | 7/2022 | Pattikonda | G02C 5/12 |
| 2010/0110374 A1* | 5/2010 | Raguin | A61B 3/1216 |
| | | | 382/117 |
| 2012/0127062 A1* | 5/2012 | Bar-Zeev | G06T 19/006 |
| | | | 345/6 |
| 2012/0194781 A1 | 8/2012 | Agurok | |
| 2016/0139662 A1* | 5/2016 | Dabhade | G06F 3/0304 |
| | | | 345/156 |

(Continued)

*Primary Examiner* — Balram T Parbadia
*Assistant Examiner* — Gabriel A Sanz
(74) *Attorney, Agent, or Firm* — Treyz Law Group, P.C.; Kendall P. Woodruff

(57) ABSTRACT

A system for gathering fixation distance calibration data may include eyeglasses with adjustable lenses and an electronic device with a depth sensor. During fixation distance calibration operations, a user wearing the eyeglasses may view the electronic device while the electronic device provides instructions for the user to hold the electronic device at different distances from the user. At each distance, a depth sensor in the electronic device may determine the distance to the eyeglasses and a camera in the eyeglasses may be used to determine a distance between the user's pupils. The calibration measurements may be used to generate calibration data that maps different pupil locations to different fixation distances. The calibration data may be stored in the eyeglasses so that control circuitry in the eyeglasses can determine a user's fixation distance and adjust lens power accordingly without requiring an outward facing depth sensor in the eyeglasses.

13 Claims, 7 Drawing Sheets

(56) References Cited

U.S. PATENT DOCUMENTS

| | | | |
|---|---|---|---|
| 2017/0205876 A1 | 7/2017 | Vidal et al. | |
| 2017/0263017 A1* | 9/2017 | Wang | G02B 27/0093 |
| 2017/0293145 A1* | 10/2017 | Miller | G02B 27/0172 |
| 2017/0344107 A1* | 11/2017 | Aghara | G06F 3/011 |
| 2019/0113772 A1* | 4/2019 | Yadin | G02F 1/1343 |
| 2020/0035027 A1* | 1/2020 | Sung | H04N 13/393 |
| 2020/0285062 A1* | 9/2020 | Grutman | G06F 3/013 |
| 2020/0331219 A1* | 10/2020 | Van Heugten | B29D 11/00817 |
| 2021/0337181 A1* | 10/2021 | Shin | H04N 13/239 |
| 2022/0304572 A1* | 9/2022 | Coveney | G06T 7/0012 |

* cited by examiner $$D_{LENS} = \frac{1}{FD} + D_{PRESCRIPTION} + D_{ACCOMMODATION}$$

SYSTEM FOR CALIBRATING ADJUSTABLE LENSES

This application claims the benefit of provisional patent application No. 63/064,804, filed Aug. 12, 2020, which is hereby incorporated by reference herein in its entirety.

FIELD

This relates generally to optical systems, and, more particularly, to devices with tunable lenses.

BACKGROUND

Eyewear may include optical systems such as lenses. For example, eyewear such as a pair of glasses may include adjustable lenses that allow users to view the surrounding environment.

It can be challenging to determine where a user is trying to focus while wearing glasses with adjustable lenses. Traditional methods for determining where a user is trying to focus may not be sufficiently accurate or may involve excessively complicated sensor fusion arrangements.

SUMMARY

Eyeglasses may be worn by a user and may include one or more adjustable lenses each aligned with a respective one of a user's eyes. For example, a first adjustable lens may align with the user's left eye and a second adjustable lens may align with the user's right eye. Each of the first and second adjustable lenses may include one or more liquid crystal cells (or other voltage-modulated optical material), one or more Alvarez lenses, one or more fluid-filled lenses, or other suitable adjustable lens. In a liquid crystal adjustable lens, each liquid crystal cell may include a layer of liquid crystal material interposed between transparent substrates. Control circuitry may adjust the optical power of the lens by applying control signals to an array of electrodes in the liquid crystal cell to adjust a phase profile of the liquid crystal material.

Eyeglasses may be calibrated using an external electronic device with a depth sensor. During fixation distance calibration operations, a user wearing the eyeglasses may view the electronic device while the electronic device provides instructions for the user to hold the electronic device at different distances from the user. At each distance, a depth sensor in the electronic device may determine the distance to the eyeglasses and a camera in the eyeglasses may be used to determine a distance between the user's pupils. The display may display a visual guide with a characteristic that changes as the distance between the eyeglasses and the electronic device changes to help guide the user to different distances as calibration data is gathered.

The calibration measurements may be used to generate calibration data that maps different pupil locations to different fixation distances. Control circuitry may process the calibration measurements to generate calibration data that maps different pupil locations to different fixation distances. The calibration data may be stored in the eyeglasses so that control circuitry in the eyeglasses can determine a user's fixation distance without requiring an outward facing depth sensor in the eyeglasses.

DETAILED DESCRIPTION

Figure 1:
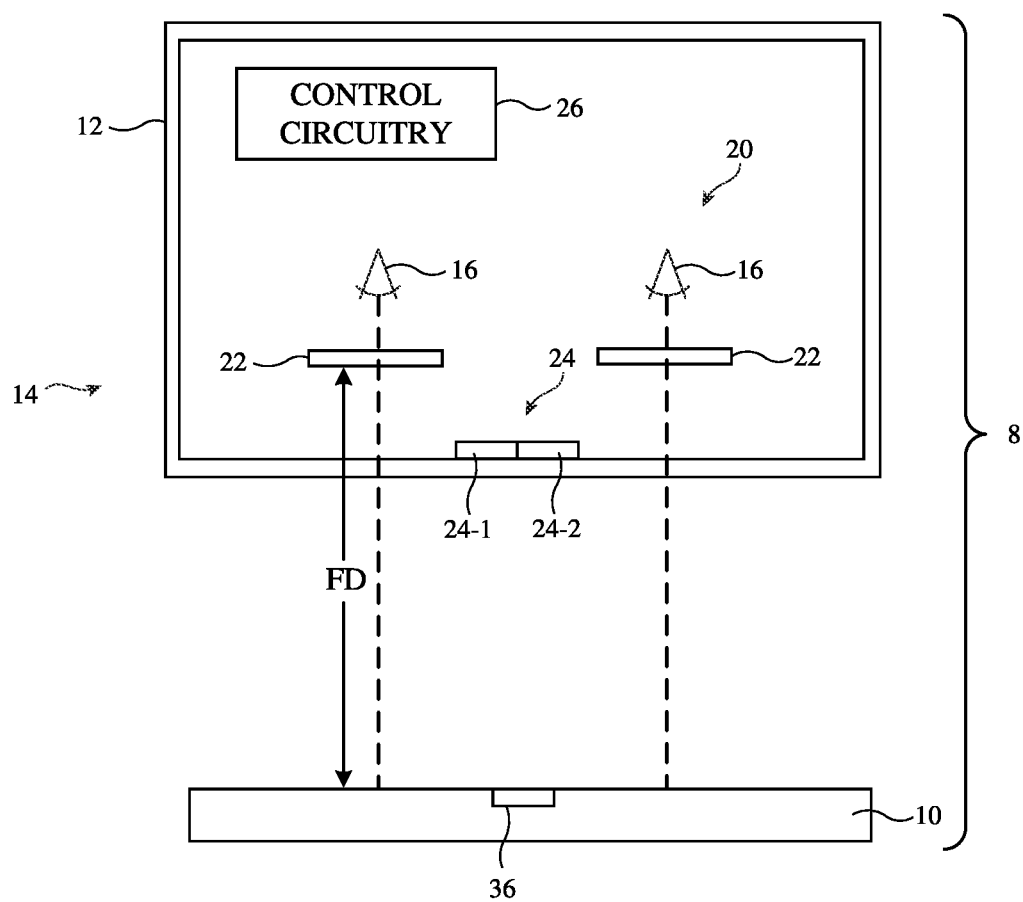
FIG. 1 is a diagram of illustrative system that includes eyeglasses with adjustable lenses and an electronic device with a depth sensor in accordance with an embodiment.

An illustrative system with one or more electrically adjustable optical elements is shown in FIG. 1. System 8 may include glasses 14 (sometimes referred to as device 14, eyeglasses 14, eyewear 14, spectacles 14, etc.) having one or more optical systems such as adjustable lens components 22 mounted in a support structure such as support structure 12. Structure 12 may have the shape of a pair of eyeglasses (e.g., supporting frames), may form a housing having a helmet shape, or may have other configurations to help in placing the components of glasses 14 on the head of a user.

Adjustable lens components 22 may form lenses that allow a viewer (e.g., user 20 having eyes 16) to view external objects in the surrounding environment. Glasses 14 may include one or more adjustable lens components 22, each aligned with a respective one of a user's eyes. As an example, lens components 22 may include a left lens 22 aligned with a viewer's left eye 16 and may include a right lens 22 aligned with a viewer's right eye 16. This is, however, merely illustrative. If desired, glasses 14 may include adjustable lens components 22 for a single eye.

Adjustable lenses 22 may, if desired, be corrective lenses that correct for vision defects. For example, a user may have eyes with vision defects such as myopia, hyperopia, presbyopia, astigmatism, and/or other vision defects. Corrective lenses such as lenses 22 may be configured to correct for these vision defects. Lenses 22 may be adjustable to accommodate users with different vision defects and/or to accommodate different focal ranges. For example, lenses 22 may have a first set of optical characteristics for a first user having a first prescription and a second set of optical characteristics for a second user having a second prescription. Glasses 14 may be used purely for vision correction (e.g., glasses 14 may be a pair of spectacles) or glasses 14 may include displays that display virtual reality or augmented reality content (e.g., glasses 14 may be a head-mounted display). In virtual reality or augmented reality systems, adjustable lens components 22 may be used to move content between focal planes. Arrangements in which glasses 14 are spectacles that do not include displays are sometimes described herein as an illustrative example.

Glasses 14 may include control circuitry 26. Control circuitry 26 may include processing circuitry such as microprocessors, digital signal processors, microcontrollers, baseband processors, image processors, application-specific integrated circuits with processing circuitry, and/or other processing circuitry and may include random-access memory, read-only memory, flash storage, hard disk storage, and/or other storage (e.g., a non-transitory storage media for storing computer instructions for software that runs on control circuitry 26).

Control circuitry 26 may control the operation of optical elements such as adjustable lens components 22. For example, control circuitry 26 may adjust the optical power of lenses 22 based on the distance at which the user's eyes 16 are focused (sometimes referred to as the user's fixation depth).

Adjustable lens components 22, which may sometimes be referred to as adjustable lenses, adjustable lens systems, adjustable optical systems, adjustable lens devices, tunable lenses, etc., may be fluid-filled adjustable lenses, adjustable lenses based on Alvarez plates, and/or adjustable lenses based on electrically adjustable material such as liquid crystal material, or other electrically or mechanically modulated material that may be adjusted to produce customized lenses. In arrangements where lenses 22 are adjustable liquid crystal lenses, each of components 22 may contain an array of electrodes that apply electric fields to portions of a layer of liquid crystal material or other voltage-modulated optical material with an electrically adjustable index of refraction (sometimes referred to as an adjustable lens power or adjustable phase profile). By adjusting the voltages of signals applied to the electrodes, the index of refraction profile of components 22 may be dynamically adjusted. This allows the size, shape, and location of the lenses formed within components 22 to be adjusted.

Glasses 14 may include input-output circuitry such as eye state sensors, range finders, touch sensors, buttons, microphones to gather voice input and other input, sensors, and other devices that gather input (e.g., user input from viewer 20 wearing glasses 14) and may include light-emitting diodes, displays, speakers, and other devices for providing output (e.g., output for viewer 20 wearing glasses 14). If desired, sensors such as an accelerometer, compass, an ambient light sensor or other light detector, a proximity sensor, a scanning laser system, and other sensors may be used in gathering input during use of glasses 14.

Glasses 14 may, if desired, include wireless circuitry and/or other circuitry to support communications with a computer or other external equipment. For example, control circuitry 26 may include wireless communications circuitry (e.g., a radio-frequency transceiver) that exchanges wireless signals with external electronic devices such as electronic device 10. Glasses 14 may send signals to and/or receive signals from electronic device 10 using wireless communications circuitry.

Sensors in glasses 14 may include one or more digital image sensors such as camera 24. Camera 24 may be an inward-facing camera that captures images of the user's eyes and/or may be an outward-facing camera that captures images of the user's environment. As an example, camera 24 may be used by control circuitry 26 to gather images of the pupils and other portions of the eyes of the viewer. The locations of the viewer's pupils and the locations of the viewer's pupils relative to the rest of the viewer's eyes may be used to determine the locations of the centers of the viewer's eyes (i.e., the centers of the user's pupils) and the direction of view (gaze direction) of the viewer's eyes. If desired, glasses 14 may include a first image sensor 24-1 for capturing images of the user's right eye 16 and a second image sensor 24-2 for capturing images of the user's left eye 16. The use of a camera to capture eye images is merely illustrative. If desired, other sensors such as ultrasonic sensors may be used for tracking pupil locations.

In some arrangements, glasses 14 may include sensors such as a depth sensor for measuring the distance to external objects that the user is focused on so that control circuitry 26 can adjust the focal power of lenses 22 based on the depth at which the user's eyes are focused. A depth sensor in glasses 14 may include a light-based proximity sensor, a time-of-flight camera sensor, a camera-based depth sensor using parallax, a structured light depth sensor (e.g., having an emitter that emits beams of light in a grid, a random dot array, or other pattern, and having an image sensor that generates depth maps based on the resulting spots of light produced on target objects), a sensor that gathers three-dimensional depth information using a pair of stereoscopic image sensors, a lidar (light detection and ranging) sensor, a radar sensor (e.g., based on ultra-wideband radio frequency signals), or other suitable sensor. In arrangements where glasses 14 include a depth sensor, control circuitry 26 may use pupil location information from camera 24 to determine which external object the user is focused on, may use the depth sensor to measure the distance to that object, and may adjust the focal power of lenses 22 accordingly.

In some arrangements, it may be desirable to be able to determine the distance at which the user's eyes 16 are focused without requiring the use of a depth sensor in glasses 14. To determine the user's fixation depth without using a depth sensor in glasses 14, control circuitry 26 may use stored calibration data that maps different pupil locations to different fixation depths. The stored calibration data may include a look-up-table or other mapping algorithm that maps the measured pupil locations information to a given fixation depth based on previously gathered calibration data.

Calibration data may be gathered while user 20 is wearing glasses 14 and looking at an external electronic device with a depth sensor, such as electronic device 10 having depth sensor 36. Depth sensor 36 may include a light-based proximity sensor, a time-of-flight camera sensor, a camera-based depth sensor using parallax, a structured light depth sensor (e.g., having an emitter that emits beams of infrared light in a grid, a random dot array, or other pattern, and having an infrared image sensor that generates depth maps based on the resulting spots of light produced on target objects), a sensor that gathers three-dimensional depth information using a pair of stereoscopic image sensors, a lidar (light detection and ranging) sensor, a radar sensor (e.g., based on ultra-wideband radio frequency signals), or other suitable sensor.

During the calibration process, user 20 may hold electronic device 10 at different distances from his or her eyes 16. At each distance, depth sensor 36 in electronic device 10 may record the distance FD between device 10 and the user's eyes 16, and inward-facing camera 24 may record the locations of the user's pupils. Control circuitry 26 and/or control circuitry in electronic device 10 may process the calibration measurements to produce corresponding calibration data that is used to map different pupil locations to different fixation depths, and the calibration data may be stored in glasses 14 for future use.

During normal operation of glasses 14 (e.g., after calibration data is gathered and stored in glasses 14), a user may focus his or her gaze on external objects while control circuitry 26 gathers pupil location information using inward-facing camera 24. A single camera 24 may capture images of both of the user's eyes 16, or a first camera 24-1 may capture images of the user's right eye 16 and a second camera 24-2 may capture images of the user's left eye 16. Control circuitry 26 may determine the locations of the user's pupils based on the captured images. For example, control circuitry 26 may determine the distance between the centers of the user's pupils (sometimes referred to as pupil-to-pupil distance or interpupillary distance). Control circuitry 26 may then use the stored calibration data (e.g., a look-up table or other mapping algorithm) to map the measured pupil location information to a given fixation depth and thereby determine the distance to the external object on which the user's gaze is focused.

Based on the depth at which the user is attempting to focus, control circuitry 26 may adjust the optical power (e.g., focal length) of lens components 22 so that the external object is in focus for the user. As the user's gaze shifts to different objects at different distances, control circuitry 26 may actively adjust the optical power of lens components 22 so that objects at different distances remain in focus.

In addition to controlling lenses 22 to focus on objects at different distances, control circuitry 26 may adjust the optical power of lenses 22 to correct for vision defects such as myopia, hyperopia, presbyopia, astigmatism, and/or other vision defects. To correct such vision defects, control circuitry 26 may obtain a user's prescription and accommodation range. Such information may be provided directly to glasses 14 by a user, may be collected from another electronic device in which a user's health data is stored, and/or may be determined using glasses 14 (e.g., during a calibration process which may take place at the same time that fixation depth calibration data is gathered, if desired). During operation of glasses 14, control circuitry 26 may determine the optimal lens power for lenses 22 based on the user's prescription, accommodation range, and stored fixation depth calibration data.

Control circuitry 26 may be configured to determine a user's prescription and/or accommodation range using a vision characterization process. The vision characterization process may be carried out using glasses 14 and an external electronic device such as device 10. The vision characterization process may be conducted at the same time that the fixation depth calibration data is gathered, or the two processes may be conducted separately.

Vision characterization calibration operations may include, for example, having the user view a displayed image on device 10 through lens 22 and adjusting the optical power of lens 22 until the displayed image is in focus. The optical power of lens 22 and the distance FD to the in-focus image may be used to determine the user's prescription and/or accommodation range.

Different properties of system 8 may be varied until the user's prescription and/or accommodation range is determined. For example, the optical power of lenses 22 may be varied, the distance FD between glasses 14 and device 10 may be varied, and/or other properties of system 8 may be varied while user input is gathered. The optical power of lens 22 and the distance FD to device 10 may be used to determine the user's prescription and accommodation range. Once a user's prescription and accommodation range are known, control circuitry 26 may operate lenses 22 in accordance with the user's prescription and accommodation range (e.g., to correct for vision defects and provide an appropriate amount of vision correction for the user).

In some arrangements, the vision characterization process may be conducted for both eyes at the same time. In other arrangements, the vision characterization process may be conducted separately for each eye to obtain the prescription and/or accommodation range of each individual eye. This may be achieved by having the user cover the eye that is not being characterized and/or by using glasses 14 to block the eye that is not being characterized.

Figure 2:
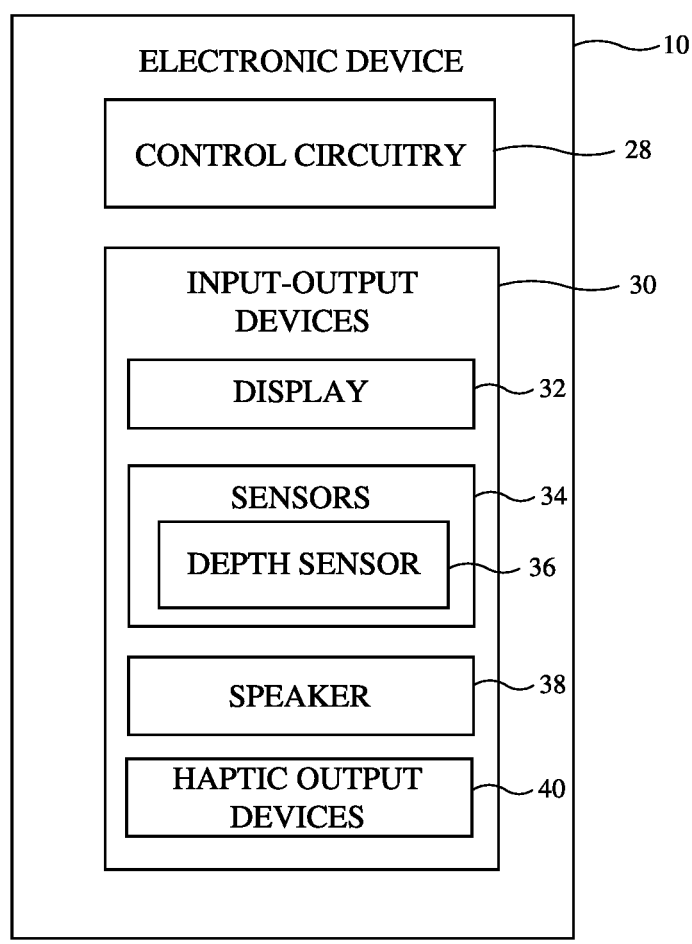
FIG. 2 is a schematic diagram of an illustrative electronic device that may be used in a system of the type described in connection with FIG. 1 in accordance with an embodiment.

An illustrative electronic device of the type that may be used in system 8 for fixation depth calibration operations and/or vision characterization operations is shown in FIG. 2. As shown in FIG. 2, electronic device 10 may have control circuitry 28. Control circuitry 28 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 28 may be used to control the operation of device 10. The processing circuitry may be based on one or more microprocessors, microcontrollers, digital signal processors, baseband processors, power management units, audio chips, application specific integrated circuits, etc.

Device 10 may include input-output circuitry such as cellular telephone transceiver circuitry, wireless local area network transceiver circuitry, and other communications circuitry. Input-output circuitry in device 10 such as input-output devices 30 may be used to allow data to be supplied to device 10 and to allow data to be provided from device 10 to external devices. Input-output devices 30 may include buttons, joysticks, scrolling wheels, touch pads, key pads, keyboards, speakers, tone generators, vibrators (e.g., piezoelectric vibrating components, etc.), light-emitting diodes and other status indicators, data ports, and other circuitry.

Input-output devices 30 may include one or more displays such as display 32. Display 32 may be a touch screen display that includes a touch sensor for gathering touch input from a user or display 32 may be insensitive to touch. A touch sensor for display 32 may be based on an array of capacitive touch sensor electrodes, acoustic touch sensor structures, resistive touch components, force-based touch sensor structures, a light-based touch sensor, or other suitable touch sensor arrangements. If desired, display 32 may include actuators to provide haptic feedback for a user.

Input-output devices 30 may include sensors 34. Sensors 34 may include strain gauge sensors, proximity sensors, ambient light sensors, touch sensors, force sensors, temperature sensors, pressure sensors, magnetic sensors, accelerometers, gyroscopes and other sensors for measuring orientation (e.g., position sensors, orientation sensors), microelectromechanical systems sensors, and other sensors. Sensors 34 may be light-based sensors (e.g., proximity sensors or other sensors that emit and/or detect light), capacitive sensors (e.g., sensors that measure force and/or touch events using capacitance measurements). Strain gauges, piezoelectric elements, capacitive sensors, and other sensors may be used in measuring applied force and can therefore be used to gather input from a user's fingers or other external source of pressure. Capacitive touch sensors may make capacitance measurements to detect the position of a user's finger(s). If desired, sensors 34 may include microphones to gather audio signals. Sensors 34 may be incorporated into display 32. For example, display 32 may have an array of light-emitting diodes and sensors 34 and/or actuator components may be incorporated into the array to provide display 32 with the ability to sense user input and provide haptic feedback in addition to the ability to display images for the user.

Sensor(s) 34, which may sometimes be referred to as sensor circuitry, may include visible light cameras and/or infrared light cameras. To capture depth information, sensors 34 in input-output devices 30 may include one or more depth sensors 36 such as light-based proximity sensors, time-of-flight camera sensors, camera-based depth sensors using parallax, structured light depth sensors (e.g., having an emitter that emits beams of light in a grid, a random dot array, or other pattern, and having an image sensor that generates depth maps based on the resulting spots of light produced on target objects), sensors that gather three-dimensional depth information using a pair of stereoscopic image sensors, lidar (light detection and ranging) sensors, radar sensors (e.g., based on ultra-wideband radio frequency signals), and/or other suitable sensors.

Input-output devices 30 may also include speakers 38 for providing audio to a user and haptic output devices 40 for providing haptic output to a user.

Control circuitry 28 may be used to run software on device 10 such as operating system code and applications. During operation of device 10, the software running on control circuitry 28 may be used in gathering user input and making measurements using sensors 34 and may be used in providing output to a user with display 32 and other output resources in input-output devices 30.

Device 10 may be a cellular telephone, a tablet computer, a laptop computer, a wrist watch device, or other portable electronic device and/or may include or be based on a desktop computer, set-top box, or other electronic equipment. Illustrative configurations in which device 10 is a portable device such as a wrist watch device, a cellular telephone, or laptop computer may sometimes be described herein as an example.

Figures 3, 4:
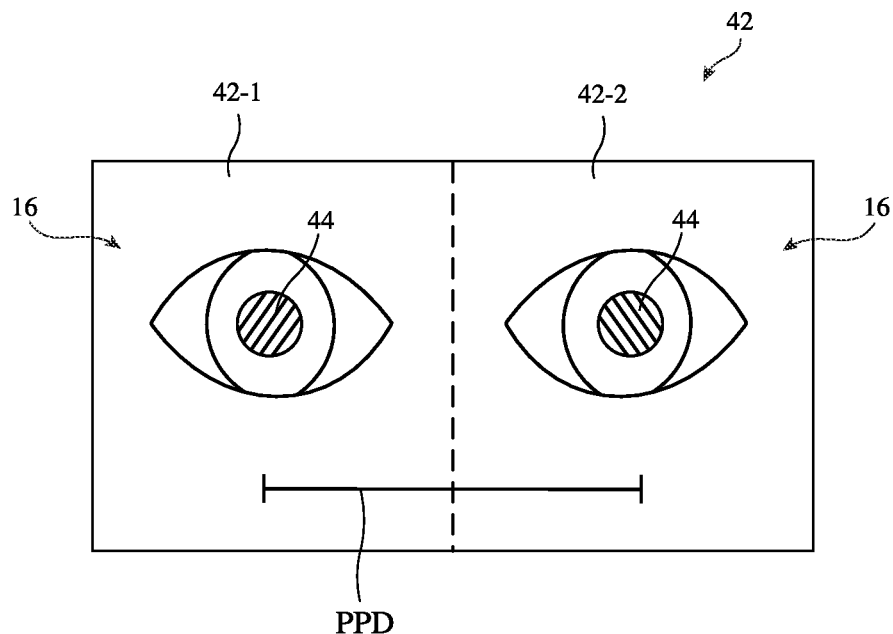
FIG. 3 is an equation describing a relationship between the optical power of a lens, fixation distance, and a user's prescription and accommodation range in accordance with an embodiment.
FIG. 4 is a diagram showing illustrative eye images that may be captured with an inward-facing camera in eyeglasses in accordance with an embodiment.

FIG. 3 is an equation for determining the diopters needed for a lens to bring an object at a given distance into focus for a user with vision defects. In equation 46 of FIG. 3, $D_{LENS}$ corresponds the focal power of lens 22 in diopters, FD corresponds to the fixation distance in meters to the object that the user is focusing on, $D_{PRESCRIPTION}$ corresponds to the user's prescription in diopters, and $D_{ACCOMMODATION}$ corresponds to the user's accommodation amplitude in diopters. System 8 of FIG. 1 may conduct a vision characterization process to determine $D_{PRESCRIPTION}$ and/or $D_{ACCOMMODATION}$ for a user. In the vision characterization process, $D_{LENS}$ and FD of equation 46 of FIG. 3 may be known and/or measurable, allowing system 8 (e.g., control circuitry 26 of glasses 14 and/or control circuitry 28 of electronic device 10) to solve for $D_{PRESCRIPTION}$. A user's accommodation amplitude ($D_{ACCOMMODATION}$ in equation 46) is generally constant across different fixation distances and can be calibrated during the vision characterization process along with $D_{PRESCRIPTION}$.

It should be understood that equation 46 of FIG. 3 is merely an illustrative example of how system 8 might determine a user's prescription. If desired, system 8 may use other methods or formulas to determine a user's prescription based on user input and distance measurements. In some arrangements, system 8 may not explicitly calculate a user's prescription but may use user input and distance measurements to determine appropriate operating parameters for glasses 14 that account for the user's prescription (e.g., may determine appropriate settings for glasses 14 that correct for any deficiencies in the user's vision).

Vision characterization operations and/or fixation distance calibration operations may be conducted by control circuitry 26, by control circuitry 28, and/or by both control circuitry 26 and control circuitry 28. Glasses 14 and electronic device 10 may include wireless communications circuitry such as radio-frequency transceiver circuitry for handling various radio-frequency communications bands. For example, control circuitry 26 and 28 may be configured to communicate with each other using wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, satellite navigation system protocols, millimeter wave communications protocols, IEEE 802.15.4 ultra-wideband communications protocols, etc.

During vision characterization operations, user 20 of FIG. 1 may view external objects such as device 10 through lens 22. User 20 may provide input to device 10 and/or may receive output from device 10. If desired, display 32 of device 10 may display an image during vision characterization operations. The lens power of lens 22 and/or distance FD between lens 22 and device 10 may be adjusted until device 10 and/or an image on display 32 is in focus for the user. Once the image is in focus, control circuitry 26 (and/or control circuitry 28) may use the optical power of lens 22 (corresponding to $D_{LENS}$ in equation 46 in FIG. 3) and the fixation distance FD (corresponding to FD in equation 46 in FIG. 3) to solve for $D_{PRESCRIPTION}$ and/or $D_{ACCOMMODATION}$ in equation 46 in FIG. 3.

Fixation distance calibration operations may take place at the same time as vision characterization operations or the two processes may be conducted separately. Since a user's pupil-to-pupil distance will change as the fixation distance FD changes, pupil-to-pupil distance may be measured at different fixation distances FD during the vision characterization process, thereby producing calibration data that control circuitry 26 can use during operation glasses 14 to estimate the user's fixation distance based on the measured pupil-to-pupil distance. This is, however, merely illustrative. If desired, the fixation distance calibration process may be a standalone process that is independent from any vision characterization process.

While the user focuses on device 10 at different distances, camera 24 in glasses 14 may capture images of the user's eyes. For example, as shown in FIG. 4, camera 24 may capture images such as image 42 of the user's eyes 16. If desired, camera 24 may include a first image sensor 24-1 that captures a first image 42-1 of the user's right eye 16 and a second image sensor 24-2 that captures a second image 42-2 of the user's left eye 16. In arrangements where separate images are captured of the user's left and right eyes 16, control circuitry 26 may stitch together images 42-1 and 42-2 to form combined image 42 of FIG. 5. Control circuitry 26 may then analyze the captured images such as image 42 to determine the locations of the user's pupils 44 and the locations of the centers of pupils 44. Control circuitry 26 may then determine the distance PPD between the centers of the two pupils 44 (sometimes referred to as pupil-to-pupil distance).

Pupil-to-pupil distance tends to vary linearly with fixation distance. The pupil-to-pupil distance PPD will tend be smaller for shorter fixation distances (e.g., when the user is focusing on closer objects) and will tend to be greater for longer fixation distances (e.g., when the user is focusing on objects further away). By measuring the user's pupil-to-pupil distance with camera 24 in glasses 14 as the user focuses on device 10 at different distances and measuring each distance with depth sensor 36 in device 10, control circuitry 26 and/or control circuitry 28 may determine a relationship between fixation distance and the user's pupil-to-pupil distance.

Figure 5:
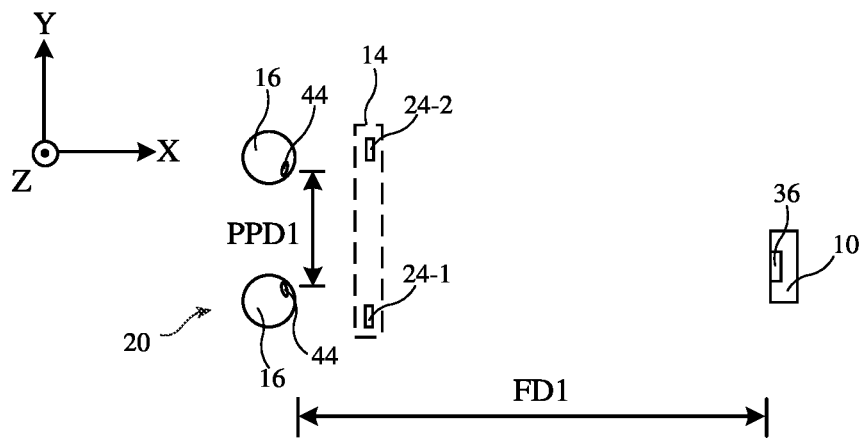
FIG. 5 is a diagram of an illustrative system showing how a user may view an electronic device at a first distance through a lens during fixation distance calibration operations in accordance with an embodiment.

As shown in FIG. 5, for example, user 20 wearing glasses 14 may hold device 10 at first distance D1 while focusing on device 10. Depth sensor 36 in device 10 may measure fixation distance D1 while control circuitry 26 determines the user's pupil-to-pupil distance PPD1 using images from cameras 24-1 and 24-2.

Figure 6:
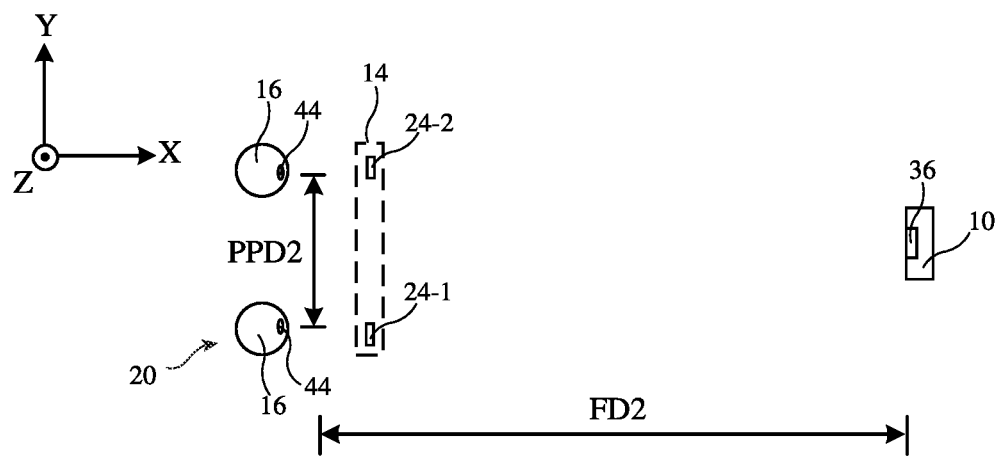
FIG. 6 is a diagram of an illustrative system showing how a user may view an electronic device at a second distance through a lens during fixation distance calibration operations in accordance with an embodiment.

As shown in FIG. 6, user 20 wearing glasses 14 may hold device 10 at second distance D2 while focusing on device 10. Depth sensor 36 in device 10 may measure fixation distance D2 while control circuitry 26 determines the user's pupil-to-pupil distance PPD2 using images from cameras 24-1 and 24-2. Because fixation distance D2 is larger than D1, pupil-to-pupil distance PPD2 will tend to be larger than pupil-to-pupil distance PPD1.

In the examples of FIGS. 5 and 6, sensor 36 measures the fixation depth as the distance between device 10 and eyes 16. If desired, sensor 36 may instead measure the fixation depth as the distance between device 10 and glasses 14. The additional distance between the user's eyes and glasses 14 may be negligible and ignored, may be estimated (e.g., based on some typical distance between glasses 14 and eyes 16 and/or based on other information) and added to the measured distance between device 10 and glasses 14, or may be measured (e.g., using an eye-facing sensor in glasses 14) and added to the distance between device 10 and glasses 14.

If desired, depth sensor 36 in device 10 may also be used to calibrate gaze tracking cameras in glasses 14 such as cameras 24-1 and 24-2. During gaze tracking camera calibration operations, the user may be instructed to hold device 10 at different positions and angles relative to the user's eyes 16 while the user looks at device 10. While the user looks at device 10 at different gaze angles, depth sensor 36 in device 10 may capture three-dimensional depth images of the user's face and eyes 16. Control circuitry 26 (and/or control circuitry 28) may analyze the three-dimensional depth images of the user's face and eyes 16 captured by depth sensor 36 to determine gaze vectors (e.g., vectors extending from the user's pupils 44 to device 10) for each different position of device 10 relative to eyes 16. These gaze vectors may serve as ground truth gaze vectors that can be stored in device 14 for calibrating gaze tracking cameras 24-1 and 24-2. For example, during operation of glasses 14, gaze tracking cameras 24-1 and 24-2 may capture images of the user's eyes 16. Control circuitry 26 may analyze the captured images and may estimate the user's gaze angle by fitting an estimated gaze vector with the ground truth gaze vectors stored in device 14.

If vision characterization operations are carried out during the fixation depth calibration procedure, then the user may adjust the optical power of lenses 22 during fixation depth calibration operations. For example, the fixation depth calibration procedure may initially start under the assumption that the user's vision is correct at infinity (sometimes referred to as emmetropic vision) with lenses 22 at 0 diopters. At a given fixation distance where pupil location information is gathered and FD is measured, such as distance FD1 of FIG. 5 or FD2 of FIG. 6, the user may adjust the optical power of lenses 22 until an image on device 10 comes into focus.

When lens 22 reaches an optical power that brings the image into focus for the user at the given distance, the user may provide input to glasses 14 and/or to electronic device 10 to indicate when the image is in focus. The user input may be touch input, voice input, motion input, button press input, or any other suitable type of user input. When the image is indicated to be in focus, the fixation distance (e.g., FD1 of FIG. 5 or FD2 of FIG. 6) may be measured using depth sensor 36 of device 10 and may correspond to FD in equation 46 of FIG. 3, while the lens power of lens component 22 when the image is indicated to be in focus corresponds to $D_{LENS}$ in equation 46 of FIG. 3. Using these two values, control circuitry 26 and/or control circuitry 28 may solve for $D_{PRESCRIPTION}$ and/or $D_{ACCOMMODATION}$ of equation 46 in FIG. 3, which may be stored in glasses 14.

A user may adjust the lens power of lens component 22 during vision characterization operations and/or fixation depth calibration operations by providing user input to device 10 and/or glasses 14 until device 10 (e.g., an image on display 32 of device 10) is in focus. A user may provide a first user input to adjust the optical power of lens 22 and may provide a second user input to indicate when the image comes into focus. For example, a user may turn a watch crown on device 10, move a slider on a touch screen on device 10, provide touch input to a touch pad on device 10, or provide other suitable input to device 10 and/or glasses 14 (e.g., touch input, voice input, motion input, button press input, etc.) to adjust the lens power until the image is in focus. When the image is in focus, the user may stop adjusting the lens power of lens 22. If no user input is received for a given period of time, control circuitry 26 may conclude that the image is in focus for the user. This is, however, merely illustrative. If desired, user 20 may provide active user input (e.g., touch input, voice input, motion input, button press input, etc.) indicating that the image is in focus. Wireless communications circuitry in device 10 may be used to convey the user input (e.g., the first user input that controls the optical power of lens 22 and the second user input that indicates the image is in focus) to glasses 14.

Figure 7:
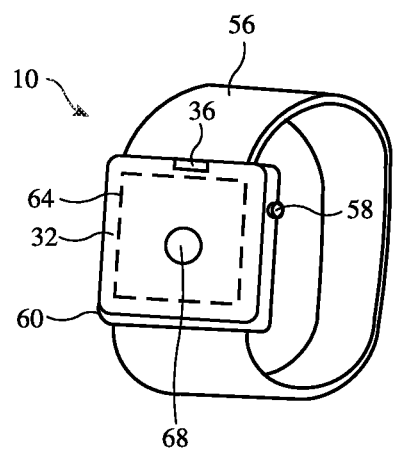
FIG. 7 is a perspective view of an illustrative electronic device having input-output devices such as a display and a crown that may be used during fixation distance calibration operations in accordance with an embodiment.
Figure 8:
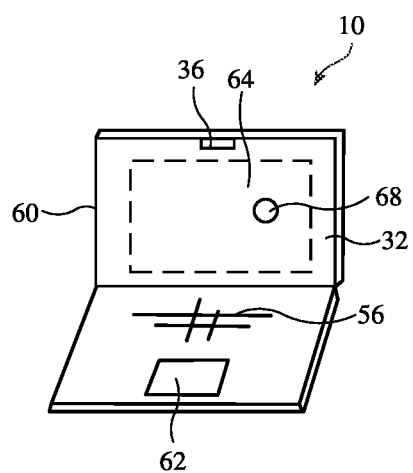
FIG. 8 is a perspective view of an illustrative electronic device having input-output devices such as a display, a keyboard, and a trackpad that may be used during fixation distance calibration operations in accordance with an embodiment.
Figure 9:
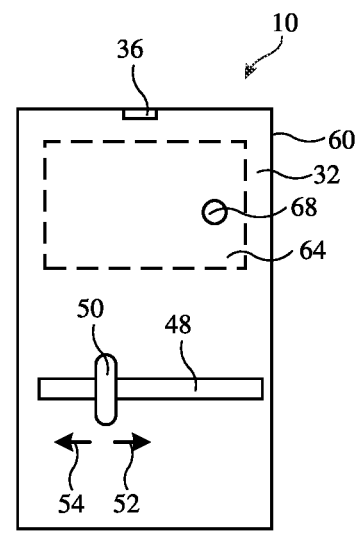
FIG. 9 is a front view of an illustrative electronic device having input-output devices such as a display and touch sensor that may be used during fixation distance calibration operations in accordance with an embodiment.

FIGS. 7, 8, and 9 are illustrative types of electronic devices 10 that may be used during fixation depth calibration operations and/or vision characterization operations.

In the example of FIG. 7, electronic device 10 is a wrist watch having a housing 60 and a band 56 that attaches housing 60 to a user's wrist. Electronic device 10 may have input-output devices such as depth sensor 36, touch screen display 32, and crown 58. During fixation depth calibration operations and/or vision characterization operations, a user wearing glasses 14 may hold device 10 at different distances while display 32 displays image 64. User 20 (FIG. 1) may view image 64 through lens 22 of glasses 14. Control circuitry 28 of device 10 may use output devices such as display 32, speakers 38, haptic output devices 40, and/or other output devices to guide a user through the fixation distance calibration process. For example, with glasses 14 starting at an initial power setting (e.g., 0 diopters, the user's known prescription, or other initial power setting), control circuitry 28 may use one or more output devices in device 10 to instruct the user to hold device 10 at a given distance from the user. The distance may be an absolute distance (e.g., one meter from the user) or a relative distance (e.g., closer to or further from the user).

When device 10 is positioned the appropriate distance from the user and the user is focusing on device 10, calibration measurements such as fixation distance and pupil-to-pupil distance may be recorded. Control circuitry 28 in device 10 may use depth sensor 36 in device 10 to measure the distance to the user (e.g., fixation distance FD) of FIG. 1, and control circuitry 26 in glasses 14 may use camera 24 to capture images of the user's eyes so that pupil location information such as pupil-to-pupil distance may be determined. After calibration measurements have been gathered at a given distance, control circuitry 28 may use output devices in device 10 to instruct a user to move device 10 to additional distances for additional calibration measurements. Calibration measurements may be gathered for any suitable number of distances (e.g., two to five different distances, five to ten different distances, more than ten different distances, less than ten different distances, etc.).

If control circuitry 26 is measuring the two-dimensional location of pupils 44 (e.g., such that each pupil location is represented with two coordinates on a two-dimensional plane), control circuitry 28 of device 10 may instruct the user to move device 10 in and out (e.g., towards and away from the user's eyes parallel to the x-axis of FIG. 6). If control circuitry 26 is measuring the three-dimensional location of pupils 44 (e.g., such that each pupil location is represented with three coordinates in three-dimensional space), control circuitry 28 of device 10 may instruct the user to move device 10 in and out (e.g., towards and away from the user's eyes parallel to the x-axis of FIG. 6) as well as side to side (e.g., at different angles relative to the x-axis of FIG. 6). If display 32 is sufficiently large, device 10 may also or instead instruct the user to look at different locations on the display, which may be sufficiently far apart to result in a measurable difference in fixation distances depending on where the user is looking on the display.

Calibration measurements at each distance may be gathered in response to user input (e.g., touch input to display 32 or other touch sensor in device 10, voice input to a microphone in device 10, crown input so as rotating or pressing crown 58, button input to a button on device 10 or glasses 14, and/or other suitable user input indicating that device 10 is in the appropriate position) and/or may be gathered automatically (e.g., without requiring user input) based on sensor data (e.g., motion sensor data indicating that device 10 has been at rest for some threshold period of time, camera images from sensor 36 or other camera in device 10, camera images from camera 24 in glasses 14, or other camera images indicating that a user's gaze is directed at display 32, and/or other sensor data).

Image 64 may include visual elements such as visual guides 68 that help instruct the user during fixation depth calibration operations. Visual guides 68 may include arrows, circles, tap points, text, Sloan letters (e.g., an eye chart), and/or other visual output that provides a user with instructions regarding where to move device 10 (e.g., whether to move device 10 closer to or further away from the user's eyes 16), where to provide user input (e.g., to tap visual element 68 when the user is looking at device 10 from a given distance), to instruct user when to adjust the focal power of lenses 22, and/or to provide other visual output to the user during fixation depth calibration operations and/or vision characterization operations.

If vision characterization operations are being conducted during the fixation depth calibration process, then the user may adjust the optical power of lenses 22 while holding device 10 at a given distance. In one illustrative arrangement, a user may rotate crown 58 to adjust the optical power of lens 22. Wireless circuitry in device 10 may send wireless signals to glasses 14 that cause control circuitry 26 to adjust the optical power of lens 22 in accordance with the rotation of crown 58. Rotation of crown 58 in one direction, for example, may result in an increase in optical power of lens 22, whereas rotation of crown 58 in the opposite direction may result in a decrease in optical power of lens 22. The speed at which control circuitry 26 adjusts the optical power of lens 22 may be based on the speed at which the user rotates crown 58 (e.g., slower rotation of crown 58 may result in slower and/or finer adjustment of lens 22, and vice versa).

As the optical power of lens 22 changes in response to rotation of crown 58, image 64 may go in and out of focus for the user. When image 64 comes into focus, the user may provide input to device 10 by pressing crown 58 inward (e.g., towards housing 60) or providing other suitable input to device 10 and/or glasses 14. Wireless circuitry in device 10 may send wireless signals to glasses 14 to communicate the user's input to device 10. When the user indicates that the image is in focus, control circuitry 26 and/or control circuitry 28 may use the lens power of lens 22 (corresponding to $D_{LENS}$ in equation 46 of FIG. 3) and the distance between device 10 and the user (corresponding to FD in equation 46 of FIG. 3) to solve for $D_{PRESCRIPTION}$ and/or $D_{ACCOMMODATION}$ in equation 46 of FIG. 3.

If desired, other types of input (e.g., touch input, voice input, motion input, button press input, etc.) to electronic device 10 and/or glasses 14 may be used to adjust the optical power of lens 22 and/or to indicate whether an object is in focus. Providing input to watch crown 58 is merely illustrative.

In the example of FIG. 8, electronic device 10 is a laptop computer having a housing 60 with upper and lower housing portions coupled by a hinge. Electronic device 10 may have input-output devices such as display 32, keyboard 56, and trackpad 62. User 20 (FIG. 1) may view image 64 through lens 22 of glasses 14. Similar to device 10 of FIG. 8, control circuitry 28 of device 10 may use output devices such as display 32, speakers 38, haptic output devices 40, and/or other output devices to guide a user through the fixation distance calibration process and/or vision characterization process. Depth sensor 36 and camera 24 may gather fixation depth calibration measurements in response to user input (e.g., touch input to trackpad 62 or other touch sensor in device 10, voice input to a microphone in device 10, button input to a button on device 10 or glasses 14, and/or other suitable user input) and/or may be gathered automatically (e.g., without requiring user input) based on sensor data. Image 64 may include visual elements such as visual guides 68 that help instruct the user during fixation depth calibration operations. If vision characterization operations are being conducted during the fixation depth calibration process, then the user may adjust the optical power of lenses 22 by providing input to device 10 and/or glasses 14.

In the example of FIG. 9, electronic device 10 is a cellular telephone having housing 60 and input-output devices such as display 32. User 20 (FIG. 1) may view image 64 through lens 22 of glasses 14. Similar to device 10 of FIG. 8, control circuitry 28 of device 10 may use output devices such as display 32, speakers 38, haptic output devices 40, and/or other output devices to guide a user through the fixation distance calibration process and/or vision characterization process. Depth sensor 36 and camera 24 may gather fixation depth calibration measurements in response to user input (e.g., touch input to display 32 or other touch sensor in device 10, voice input to a microphone in device 10, button input to a button on device 10 or glasses 14, and/or other suitable user input) and/or may be gathered automatically (e.g., without requiring user input) based on sensor data. Image 64 may include visual elements such as visual guides 68 that help instruct the user during fixation depth calibration operations.

If vision characterization operations are being conducted during the fixation depth calibration process, then the user may adjust the optical power of lenses 22 by providing input to device 10 and/or glasses 14. For example, display 32 may display user interface elements such as slider 50 and bar 48. A user may move slider 50 along bar 48 to adjust the optical power of lens 22. Wireless circuitry in device 10 may send wireless signals to glasses 14 that cause control circuitry 26 to adjust the optical power of lens 22 in accordance with movement and position of slider 50 on bar 48. Moving slider 50 in direction 52, for example, may result in an increase in optical power of lens 22, whereas moving slider 50 in direction 54 may result in a decrease in optical power of lens 22. The speed at which control circuitry 26 adjusts the optical power of lens 22 may be based on the speed at which the user moves slider 50 (e.g., slower movement of slider 50 may result in slower and/or finer adjustment of lens 22, and vice versa). If desired, other types of user interface elements and/or other types of touch input (e.g., clicking, pressing, swiping, pinching, etc.) may be used during vision characterization operations. The use of slider 50 and bar 48 on display 32 is merely illustrative.

If desired, other types of input (e.g., touch input, voice input, motion input, button press input, etc.) to electronic device 10 and/or glasses 14 may be used to adjust the optical power of lens 22 and/or to indicate when an object is in focus. Providing input to display 32 is merely illustrative.

Figure 10:
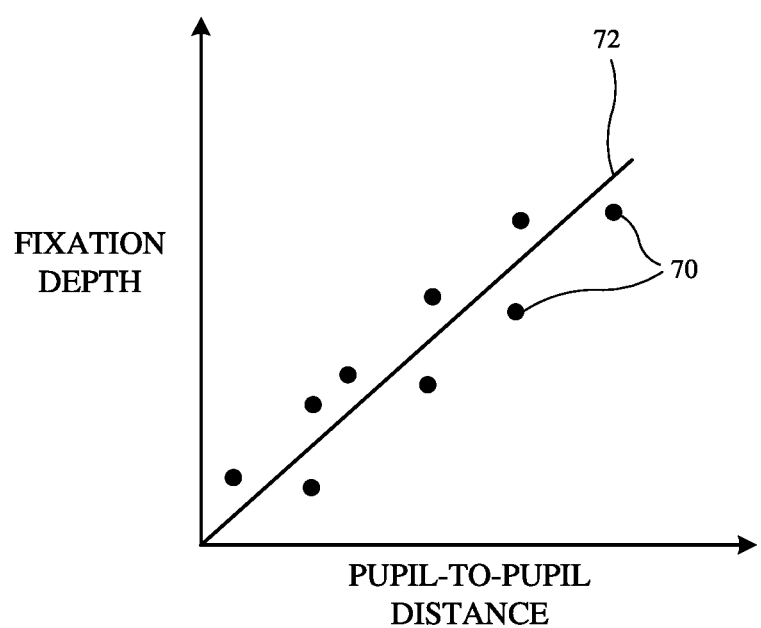
FIG. 10 is a graph showing illustrative fixation depth calibration data that may be gathered and stored in eyeglasses in accordance with an embodiment.

FIG. 10 is a graph of illustrative calibration data that may be gathered using device 10 and glasses 14 and stored in glasses 14. As shown in FIG. 10, each calibration data point 70 may correspond to a pupil-to-pupil distance measured by camera 24 in glasses 14 at a given fixation distance measured by depth sensor 36 in device 10. Processing circuitry such as control circuitry 28 in device 10, control circuitry 26 in glasses 14, and/or other suitable processing circuitry may process the calibration data (e.g., using liner regression, least squares, and/or any other suitable numerical analysis technique) to generate calibration data that maps different pupil-to-pupil distances to different fixation distances. For example, control circuitry 26 may store calibration data associated with best-fit line 72 in glasses, which may be used to determine fixation distances during operation of glasses 14 without requiring an outward-facing depth sensor in glasses 14.

Figure 11:
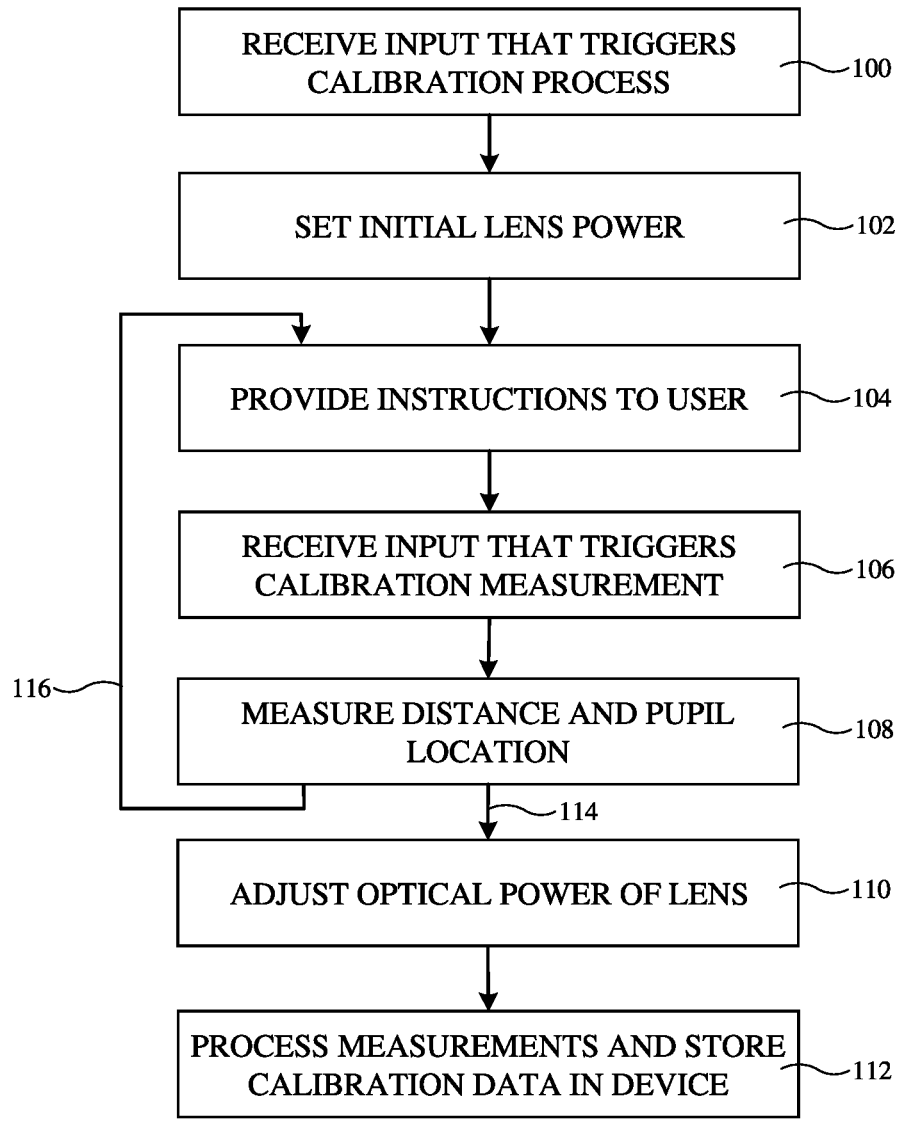
FIG. 11 is a flow chart of illustrative steps involved in fixation depth calibration operations in accordance with an embodiment.

FIG. 11 is a flow chart of illustrative steps involved in gathering fixation depth calibration data.

At step 100, control circuitry 26 of glasses 14 and/or control circuitry 28 of device 10 may receive input that triggers the calibration process. This may include, for example, receiving user input on device 10 and/or glasses 14 (e.g., touch input, voice input, button input, etc.) indicating that the user wishes to calibrate glasses 14, receiving sensor input from one or more sensors in device 10 and/or glasses 14 (e.g., sensor input indicating that the user is wearing glasses 14 that have not yet been calibrated), and/or receiving other suitable input.

At step 102, control circuitry 26 of glasses 14 and/or control circuitry 28 of device 10 may set an initial lens power of lenses 22. If the user's prescription is known, the lens power of lenses 22 may be set to the user's prescription. If the user's prescription is not known, then the lens power of lenses 22 may be set to 0 diopters or other suitable lens power.

At step 104, control circuitry 26 of glasses 14 and/or control circuitry 28 of device 10 may provide instructions to the user using output devices in device 10 and/or output devices in glasses 14. This may include, for example, providing visual instructions on display 32 of device 10, providing audio instructions from speaker 38 in device 10, and/or providing instructions from another output device. The instructions may help guide the user through the calibration process (e.g., may instruct the user to look at device 10 at different distances). For example, the instructions may instruct the user where to hold device 10 (e.g., how far from the user's face to hold device 10, whether to move device 10 closer to or further from the user's face, whether to move device 10 in and out or side-to-side, etc.), where to look on display 32, and/or other suitable instructions. If desired, output devices in device 10 and/or in glasses 14 may be used to provide feedback to the user as the user moves device 10. For example, visual feedback on display 32, audio feedback from speaker 38, and/or haptic feedback from haptic output devices 40 may be used to let the user know that device 10 has reached and/or is approaching the appropriate position, that device 10 needs to be moved in a different direction, that the user needs to fix his or her gaze on device 10, etc.

At step 106, control circuitry 26 of glasses 14 and/or control circuitry 28 of device 10 may receive input indicating that a calibration measurement should be captured. For example, calibration measurements at each distance may be gathered in response to user input (e.g., touch input to display 32 or other touch sensor in device 10, button input to a button on device 10 or glasses 14, and/or other suitable user input) and/or may be gathered automatically (e.g., without requiring user input) based on sensor data (e.g., motion sensor data indicating that device 10 has been at rest for some threshold period of time, camera images from sensor 36 or other camera in device 10, camera images from camera 24 in glasses 14, or other camera images indicating that a user's gaze is directed at display 32, and/or other sensor data).

At step 108, calibration measurements may be gathered in response to the input received in step 106. Depth sensor 36 in device 10 may measure the distance from device 10 to glasses 14 and/or the user's eyes 16 (e.g., the fixation distance), and camera 24 in glasses 14 may capture images of the user's eyes 16 so that control circuitry 26 can determine pupil locations (e.g., pupil-to-pupil distance) based on the captured images.

As indicated by arrow 116, steps 104, 106, and 108 may be repeated so that calibration data (e.g., data points 70 of FIG. 10) can be gathered with device 10 at different distances from glasses 14. When sufficient data has been gathered (e.g., after gathering two to five data points 70, five to ten data points 70, more than ten data points 70, less than ten data points 70, etc.), processing may proceed to step 110 (if vision characterization operations are to be conducted) or step 112 (if vision characterization is not needed or desired).

At optional step 110, control circuitry 26 of glasses 14 and/or control circuitry 28 of device 10 may adjust the lens power of lenses 22 in accordance with user input. For example, touch input to display 32 or other touch sensor in device 10 or glasses 14, button input to a button on device 10 or glasses 14, voice input, and/or other suitable user input may be used to increase or decrease the power of lens 22 (e.g., until an image on display 32 comes into focus for the user). When the image is in focus, the user may provide additional input indicating that the image is in focus. When the lens power is such that the image is in focus for the user, control circuitry 26 of glasses 14 and/or control circuitry 28 of device 10 may record the lens power and distance measurement from depth sensor 36 so that the user's prescription can be determined using equation 46 of FIG. 3.

At step 112, control circuitry 26 of glasses 14 and/or control circuitry 28 of device 10 may process the calibration data gathered in step 108 to compute a mapping algorithm (e.g., a best-fit line such as line 72 of FIG. 10) based on the measured fixation distances and corresponding pupil locations. The mapping algorithm may be used to map different pupil locations (e.g., different pupil-to-pupil distances) to different fixation distances and may be stored in glasses 14. If desired, control circuitry 26 of glasses 14 and/or control circuitry 28 of device 10 may determine the user's prescription based on data gathered in step 110 and the user's prescription may also be stored in glasses 14.

During operation of glasses 14, control circuitry 26 may capture images of the user's eyes 16 using camera 24. Based on the captured images, control circuitry 26 may determine the locations of the user's pupils 44 and the corresponding pupil-to-pupil distance. Control circuitry 26 may use the stored fixation distance calibration data to determine the distance at which the user's eyes are focused based on the measured pupil-to-pupil distance. Control circuitry 26 may then adjust the optical power of lenses 22 based on the fixation distance (e.g., so that objects at the fixation distance are in focus for the user) and based on the user's prescription.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. A system, comprising:
 eyeglasses with adjustable lenses, a camera, and control circuitry;
 an electronic device having a depth sensor, wherein the depth sensor comprises an image sensor that measures a distance to the eyeglasses while the electronic device is positioned at different distances from the eyeglasses, wherein the camera gathers pupil location information at each of the different distances, and wherein the electronic device comprises a display that displays an image and that provides user instructions to indicate where the electronic device should be positioned relative to the eyeglasses; and
 control circuitry in the eyeglasses that is configured to adjust the optical power of the adjustable lenses until input is received indicating that the image is in focus at a given one of the different distances, wherein the control circuitry stores fixation depth calibration data based on the measured distance to the eyeglasses and the pupil location information, and wherein the control circuitry is configured to adjust an optical power of the adjustable lens based on the fixation depth calibration data.

2. The system defined in claim 1 wherein the depth sensor comprises an infrared depth sensor that emits structured light.

3. The system defined in claim 1 wherein the camera gathers the pupil location information by capturing eye images.

4. The system defined in claim 3 wherein the control circuitry determines a pupil-to-pupil distance based on the eye images.

5. The system defined in claim 1 wherein the display displays a visual guide with a characteristic that changes as the electronic device is positioned at the different distances from the eyeglasses.

6. The system defined in claim 1 wherein the control circuitry is configured to determine a prescription based on the depth measurement at the given one of the different distances and the optical power of the adjustable lens when the input is received indicating that the image is in focus.

7. The system defined in claim 1 wherein the adjustable lenses comprise liquid crystal lenses.

8. The system defined in claim 1 wherein the depth sensor gathers the depth sensor measurements in response to user input at each of the different distances.

9. The system defined in claim 8 wherein the user input comprises touch input.

10. The system defined in claim 1 wherein the depth sensor measures the distance to the eyeglasses in response to the input indicating that the image is in focus.

11. An electronic device configured to wirelessly communicate with eyeglasses having adjustable lenses, comprising:
 a display that provides user instructions while the electronic device is positioned at first and second different distances from the eyeglasses;
 a touch sensor that receives a first touch input at the first distance and a second touch input at the second distance, wherein the first and second touch inputs indicate when an image on the display is in focus for the user; and
 a depth sensor that gathers a depth sensor measurement at each of the first and second different distances in response to the respective first and second touch inputs, wherein the depth sensor measurements are used to produce fixation distance calibration data that maps different pupil locations to different fixation distances.

12. The electronic device defined in claim 11 wherein the display displays a visual guide having a characteristic that changes as the electronic device moves between the different distances.

13. The electronic device defined in claim 11 wherein the depth sensor comprises an infrared depth sensor that emits structured light.

* * * * *